United States Patent [19]

Shirasaka

[11] Patent Number: 4,813,279

[45] Date of Patent: Mar. 21, 1989

[54] ULTRASONIC IMAGING APPARATUS

[75] Inventor: Toshio Shirasaka, Tochigi, Japan

[73] Assignee: Kabushiki Kaisha Toshiba, Kawasaki, Japan

[21] Appl. No.: 937,418

[22] Filed: Dec. 3, 1986

[30] Foreign Application Priority Data

Dec. 6, 1985 [JP] Japan .................. 60-273290

[51] Int. Cl.$^4$ ............................. G01N 29/00
[52] U.S. Cl. ...................................... 73/626
[58] Field of Search .............. 73/626; 128/660; 367/103, 105

[56] References Cited

U.S. PATENT DOCUMENTS

| | | | |
|---|---|---|---|
| 4,319,489 | 3/1982 | Yamaguchi et al. | 73/626 |
| 4,392,379 | 7/1983 | Yamaguchi | 73/626 |
| 4,541,435 | 9/1985 | Saito et al. | 128/660 |
| 4,649,927 | 3/1987 | Fehr et al. | 128/660 |
| 4,665,924 | 5/1987 | Saito et al. | 128/660 |

Primary Examiner—Stewart J. Levy
Assistant Examiner—Robert P. Bell
Attorney, Agent, or Firm—Finnegan, Henderson, Farabow, Garrett, & Dunner

[57] ABSTRACT

An ultrasonic imaging apparatus is constituted by an ultrasonic transducer for scanning an object to be examined with an ultrasonic beam in a plurality of scan directions and converting echo waves from the object into echo signals, a transmitter for driving the ultrasonic transducer, so as to cause the ultrasonic transducer to emit the ultrasonic beam twice in each scan direction, a delay circuit for causing the echo signals to be subjected to signal-processing by different delay amounts to alternately form odd- and even-numbered receiving focus regions in the scan direction upon two transmission operations of the ultrasonic beam and for outputting echo signal components corresponding to the odd- and even-numbered receiving focus regions, and a mixing circuit for mixing the echo signal components corresponding to the odd- and even-numbered receiving focus regions to form video data for one scan line. The video data obtained from the mixing circuit is displayed on a monitor as an ultrasonic tomographic image.

3 Claims, 3 Drawing Sheets

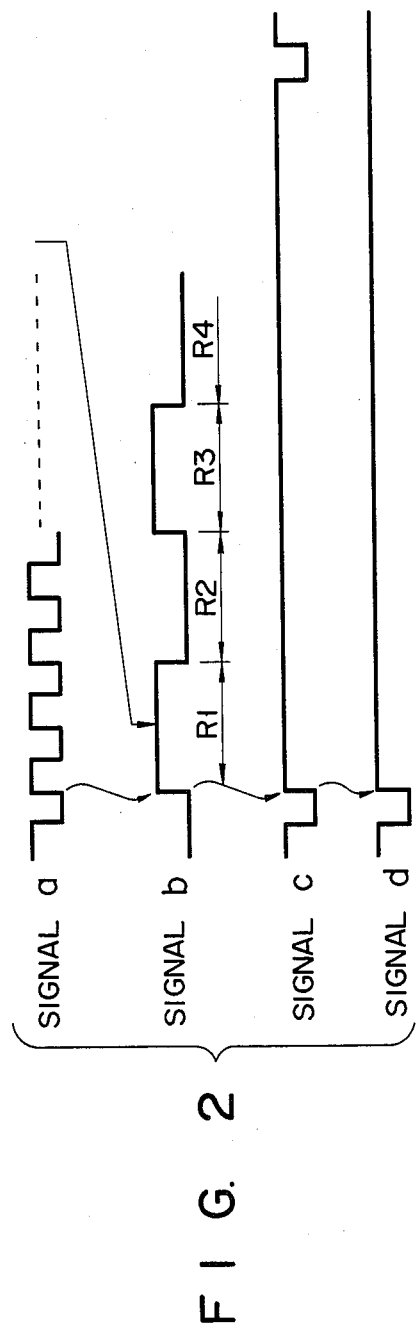
F I G. 2
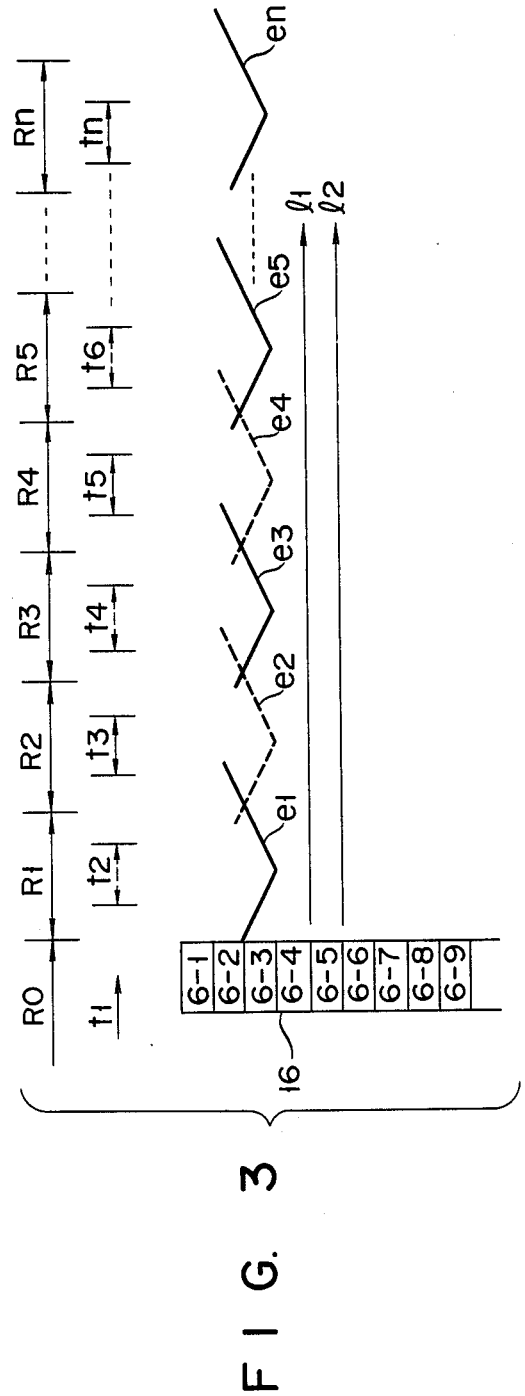
F I G. 3

ULTRASONIC IMAGING APPARATUS

BACKGROUND OF THE INVENTION

The present invention relates to an ultrasonic imaging apparatus.

An ultrasonic imaging apparatus is utilized as an ultrasonic diagnosis apparatus in the medical field The ultrasonic diagnosis apparatus uses a phased array to electronically focus an ultrasonic beam, thereby outputting an ultrasonic tomographic image with high resolution. A normal ultrasonic diagnosis apparatus can set only one focus point inside an object to be examined. For this reason, the apparatus cannot obtain a high-resolution image in a region outside the focus point. Some methods have been proposed in order to solve this problem. In one method, a focus point is moved in a depth direction during reception. In this method, a circuit which processes echo signals of ultrasonic transducer elements to align the focus point during reception with the wavefronts of echoes incident on the transducer elements is provided. As this circuit, an analog delay circuit using LC delay lines and a CCD (Charge Coupling Device) is adopted, and terminals of the delay lines are switched upon movement of the focus point. This switching operation induces noise, and the noise is mixed into the image signal.

A device for preventing the influence of the switching noise was therefore developed. This device is disclosed in U.S. Pat. No. 4,392,379. With this device, 2-channel reception delay circuits are arranged, so that while the delay time of one delay circuit is switched to change the focus point, a reception signal corresponding to the preceding focus point is fed through the other delay circuit to an output circuit. After the completion of signal processing with respect to one focus point, the delay circuit to be connected to the output circuit is switched, and the same operation is performed. In this way, when the delay circuits are alternately connected to the output circuit, the focus point is sequentially moved. With this device, since no signal passes through the delay circuit whose taps are changed, no noise is generated during tap changing. However, since the 2-channel delay circuits are required, this results in a bulky and expensive apparatus. Furthermore, when the delay circuits are alternately connected to the output circuit, some switching noise is inevitably generated, and noise cannot be completely eliminated.

SUMMARY OF THE INVENTION

It is an object of the present invention to provide an ultrasonic imaging apparatus which can prevent noise and can obtain high resolution.

The ultrasonic imaging apparatus of the present invention comprises ultrasonic transducer means for scanning an object to be examined with an ultrasonic beam and converting echoes from the object into echo signals, a transmitter for driving said ultrasonic transducer means twice so that said ultrasonic transducer means generates the ultrasonic beam twice in a scan direction, delay processing means for causing the echo signals to be subjected to signal processing by different delay amounts to alternately form odd- and even numbered receiving focus regions in the scan direction and outputting echo signal components corresponding to the odd- and even-numbered receiving focus regions, mixing means for mixing the echo signal components corresponding to the odd- and even-numbered receiving focus regions output from said delay processing means and forming video data for one scan line, and means for displaying the video data obtained by said mixing means as an image.

BRIEF EXPLANATION OF THE DRAWINGS

FIG. 2 is a timing chart for explaining the operation of the ultrasonic imaging apparatus shown in FIG. 1;

FIG. 3 is a view for explaining reception focusing;

DETAILED DESCRIPTION OF THE PREFERRED EMBODIMENT

Figure 1:
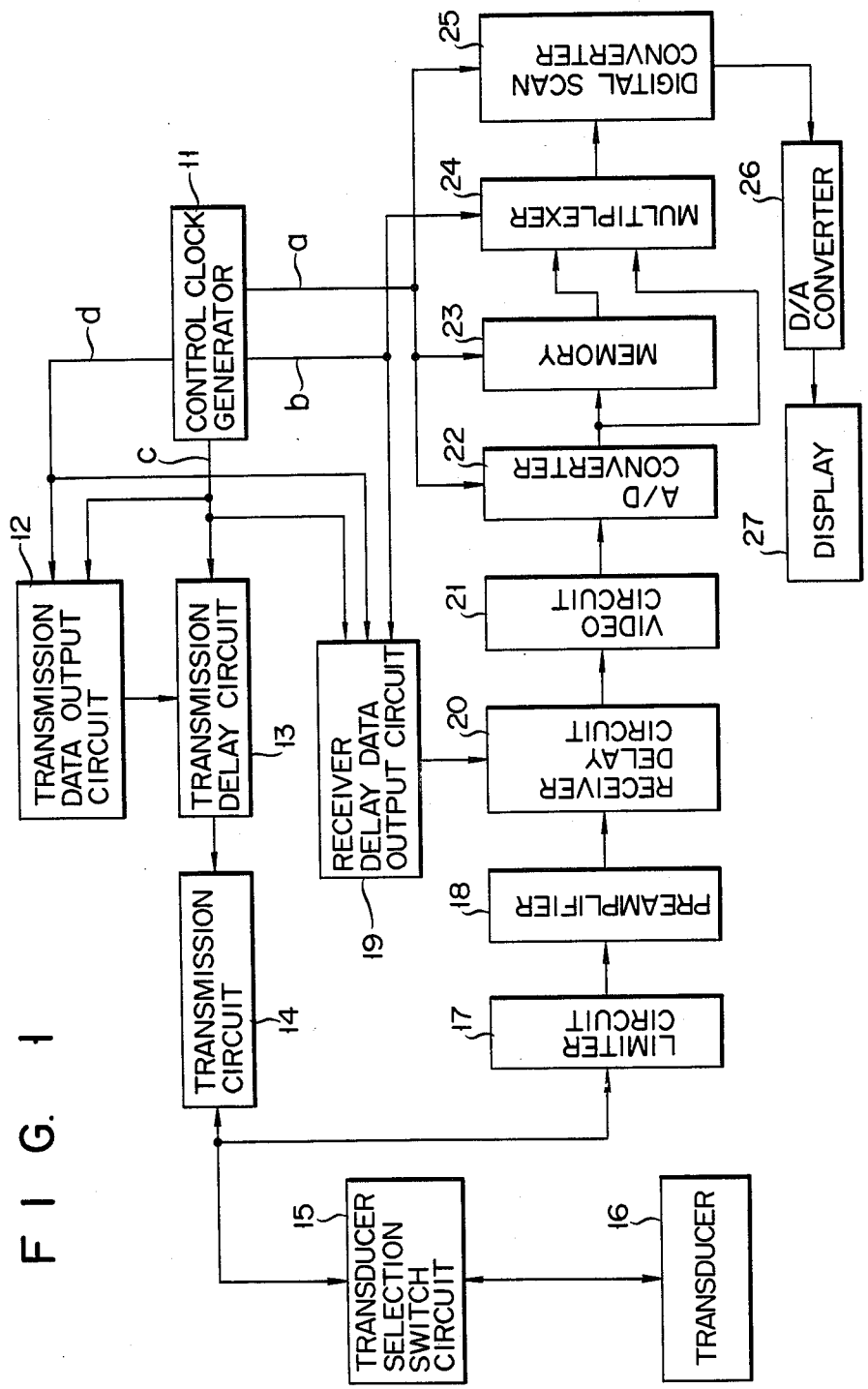
FIG. 1 is a block circuit diagram of an ultrasonic imaging apparatus according to an embodiment of the present invention.

Referring to FIG. 1, control clock generator 11 generates clock signals a, b, c, and d, shown in FIG. 2. The clock (c) output terminal of generator 11 is connected to transmission data output circuit 12. Output circuit 12 outputs transmission data corresponding to an ultrasonic scanning or steering direction, and its output terminal is connected to transmission delay circuit 13.

Delay circuit 13 has delay elements whose delay time is set by the transmission data, and its output terminal is connected to transmission circuit 14. The output terminal of circuit 14 is connected to ultrasonic transducer 16 through transducer selection switch circuit 15.

Ultrasonic transducer 16 is connected to limiter circuit 17 through transducer selection switch circuit 15. Limiter circuit 17 limits the transmission signal of transmission circuit 14, and allows a reception signal, i.e., an echo signal, to pass therethrough. The output terminal of limiter circuit 17 is connected to receiver delay circuit 20. Circuit 20 sets a delay time in accordance with delay data of receiver delay data output circuit 19.

The output terminal of delay circuit 20 is connected to video circuit 21. The output terminal of video circuit 21 is connected to memory 23 and one terminal of multiplexer 24 through A/D converter 22. The readout terminal of memory 23 is connected to the other terminal of multiplexer 24. The output terminal of multiplexer 24 is connected to digital scan converter 25. The output terminal of converter 25 is connected to display 27 through D/A converter 26.

A clock (a) output terminal of control clock generator 11 is connected to A/D converter 22, memory 23, and digital scan converter 25. A clock (b) terminal of control clock generator 11 is connected to receiver delay data output circuit 19 and multiplexer 24. The clock (c) output terminal of control clock generator 11 is connected to transmission data output circuit 12, transmission delay circuit 13, and receiver delay data output circuit 19.

In the apparatus shown in FIG. 1, when frame signal d is input from control clock generator 11 to transmission data output circuit 12, transmission data- is input from output circuit 12 to transmission delay circuit 13. Delay circuit 13 delays transmission rate pulses c input from generator 11 in accordance with a delay amount set by the transmission data, and inputs the delayed transmission rate pulses to transmitter 14. Transmitter 14 converts the transmission rate pulses into high voltage drive pulses- The high voltage drive pulses output from transmitter 14 are supplied to transducer elements selected by switch circuit 15, e.g., transducer elements 6-1 to 6-8 shown in FIG. 3.

Ultrasonic transducer elements 6-1 to 6-8, energized by the high voltage drive pulses, emit an ultrasonic beam along first line 11 to an object to be examined, i.e., a living body. Echoes from portions of different impedances are converted to echo signals by transducer 16, and are input to limiter circuit 17 through switch circuit 15. Limiter circuit 17 prevents passage of transmission pulses and allows echo signals to pass therethrough. The echo signals passed through limiter circuit 17 are amplified by preamplifier 18, and are input to receiver delay circuit 20.

Figure 4:
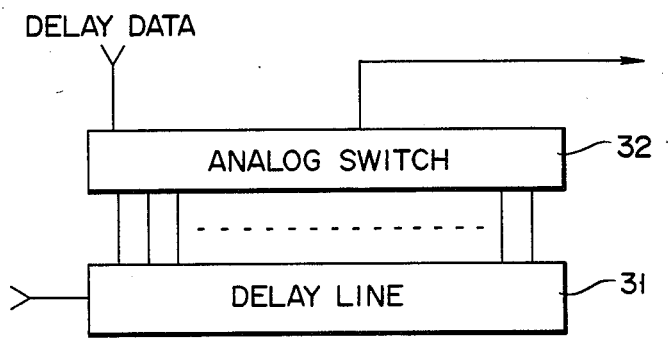
FIG. 4 is a circuit diagram of a delay circuit.
Figure 5:
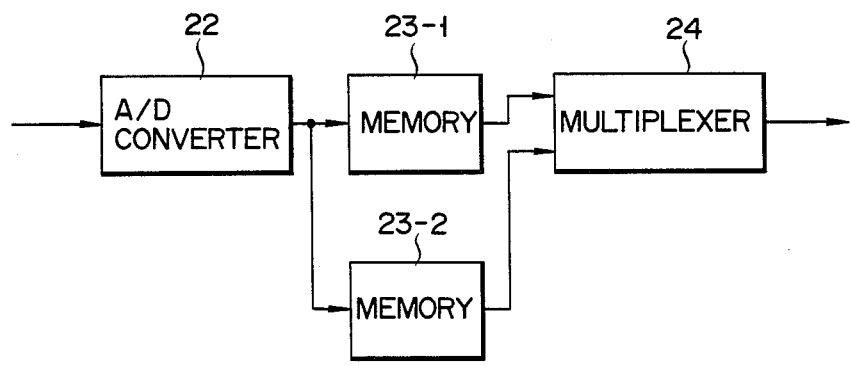
FIG. 5 is a circuit diagram of a mixing circuit portion in an ultrasonic imaging apparatus according to another embodiment of the present invention.

Delay circuit 20 comprises delay line 31 and analog switch 32 for switching taps of line 31, as shown in FIG. 4. Analog switch 32 performs a switching operation in accordance with delay data from output circuit 19. Output circuit 19 outputs delay data to delay circuit 20 so as to set delay times t1 to tn for setting focus points e1 to en in a plurality of, e.g., 30 to 40 divided regions R1 to Rn in the ultrasonic propagating direction, as shown in FIG. 3. In this case, output circuit 19 outputs delay data for forming odd-numbered focus points e1, e3, e5 ... with respect to the first drive pulse, and outputs delay data for forming even-numbered focus points e2, e4, ... with respect to the second drive pulse. Note that a focus interval is set to be larger than a noise generation interval, e.g., 2.5 to 5 μ.

More specifically, when the first drive pulse is generated and an echo signal corresponding to this pulse is input to delay circuit 20, output circuit 19 determines a delay amount for forming focus point e1 in region R1 in accordance with signal b for selecting focus region R1 during reception, repetition signal c of ultrasonic transmission pulses, and frame repetition signal d, in region R0, i.e., at time t1, corresponding to region R0, before the transmission pulse is generated. The determined delay data is output to delay circuit 20. Analog switch 32 is switched in response to the delay data, and a delay time for obtaining focus point e1 is set in delay circuit 20. An echo signal, delayed by delay circuit 20 and corresponding to focus point e1, is input to video circuit 21. At this time, a noise component is mixed in the output signal of delay circuit 20. However, the delayed signal containing the noise component is detected by video circuit 21, and is subjected to envelope filter processing. The echo signal processed by video circuit 21 is converted to digital data by A/D converter 22 in synchronism with clock pulse signal a. In other words, the echo signal is sampled in response to clock pulse signal a. The output data of A/D converter 22 is stored in memory 23.

A delay amount for forming focus point e3 is determined at time t3, corresponding to region R2, thus skipping region R1. Output circuit 19 outputs delay data corresponding to the determined delay amount to delay circuit 20. Analog switch 32 is switched in response to this delay data, and a delay time for obtaining focus point e3 is set in delay circuit 20. When an echo signal corresponding to focus point e3 is input to video circuit 21, it is detected thereby and subjected to envelope filter processing. The echo signal processed by video circuit 21 is converted to digital data by A/D converter 22, and is stored in memory 23.

Similarly, delay data, for sequentially obtaining odd-numbered focus points after focus point e5, are sequentially output from output circuit 19, and are input to delay circuit 20. Therefore, echo signals are delayed by the corresponding delay amounts, and are stored in memory 23 through video circuit 21 and A/D converter 22. After completion of signal processing of echo signals corresponding to odd-numbered regions R1, R3, R5, ..., transducer elements 6-1 to 6-8 of transducer 16 are energized by the second drive pulse, and emit ultrasonic beams in the same scanning direction as above. When echo signals obtained by the second transmission are input to delay circuit 20, output circuit 19 outputs delay data for forming focus points e2, e4, ... in even-numbered regions R2, R4, ... More specifically, output circuit 19 determines a delay amount for forming focus point e2 in region R2 at time t2, in accordance with signal b, for selecting focus region R2 during reception, repetition signal c of ultrasonic transmission pulses, and frame repetition signal d, and outputs the delay data to delay circuit 20. Analog switch 32 is switched in response to this delay data, and a delay time for obtaining focus point e2 is set in delay circuit 20. An echo signal, output from delay circuit 20 and corresponding to focus point e2, is input to video circuit 21. At this time, a noise component is mixed in the output signal of delay circuit 20. However, the output signal is detected by video circuit 21, and subjected to envelope filter processing. The echo signal processed by video circuit 21 is converted to digital data by A/D converter 22 in synchronism with clock pulse signal a. At this time, memory 23 is set in a read mode, and first stored echo video data corresponding to region R1 is read out from memory 23. The video data of memory 23 and echo video data corresponding to region R2 from A/D converter 22 are sequentially selected and mixed. Upon mixing of the video data, data at a boundary between regions which is easily influenced by a noise component, i.e., a junction region between regions R1 and R2, is compensated, thus eliminating the noise component from the mixed data.

As described above, the video data of the odd- and even-numbered regions are alternately selected by multiplexer 24, and are input to digital scan converter 25, thereby forming video data for one line. When the video data for one line is formed as above, transducer elements 6-2 to 6-9 for obtaining echo signals of second line 12 of a linear scan are selected by switch circuit 15, and are driven by drive pulses. Video data for second line 12 can be obtained by two transmission operations in the same manner as described above. Thereafter, ultrasonic scanning is performed until the last line, and video data for one frame is stored in digital scan converter 25.

Digital scan converter 25 converts the stored video data for one frame into a TV signal, and inputs it to display 27 through D/A converter 26. Display 27 displays an ultrasonic tomographic image.

In the above embodiment, video data obtained in odd- and even-numbered regions and output from A/D converter 22 can be respectively stored in first and second memories 23-1 and 23-2, so that the video data output from these memories can be alternately selected by multiplexer 24. A scan method is not limited to linear scan but can be sector scan.

What is claimed is:

1. An ultrasonic imaging apparatus comprising:
    ultrasonic transducer means for scanning, in a plurality of scan directions, an object to be examined with a plurality of ultrasonic beams and for converting echoes from the object corresponding to each of said plurality of ultrasonic beams into echo signals;

transmitter means for driving said ultrasonic transducer means twice in each of said plurality of scan directions to sequentially generate first and second ultrasonic beams in each of said plurality of scan directions;

delay processing means, coupled to said transmitter means, for delaying said echo signals by different delay amounts to alternately form, in each of said plurality of scan directions, first and second receiving focal regions, and outputting echo signal components corresponding to each of said first and second receiving focal regions;

mixing means for mixing the echo signal components corresponding to each of said first and second receiving focal regions output from said delay processing means, and for forming video data for one scan line, said mixing means including first memory means for storing echo signal components corresponding to said first receiving focal regions, second memory means for storing echo signal components corresponding to said second receiving focal regions, and means for alternately selecting the echo signal components sequentially read out from said first and second memory means and mixing said selected components; and means for displaying as an image the video data obtained by said mixing means;

wherein said delay processing means comprises delay data output means for sequentially outputting, in each of said first ultrasonic beams, delay data corresponding to each of said first receiving focal regions, and sequentially outputting, in each of said second ultrasonic beams, delay data corresponding to each of said second receiving focal regions, and further comprising delay circuit means, responsive to said delay data, for delaying said echo signals.

2. An apparatus according to claim 1, wherein said transmitter means comprises means for driving said ultrasonic transducer means to perform a linear scan.

3. An apparatus according to claim 1, wherein said transmitter means comprises means for driving said ultrasonic transducer means to perform a sector scan.

* * * * *